UNITED STATES PATENT OFFICE.

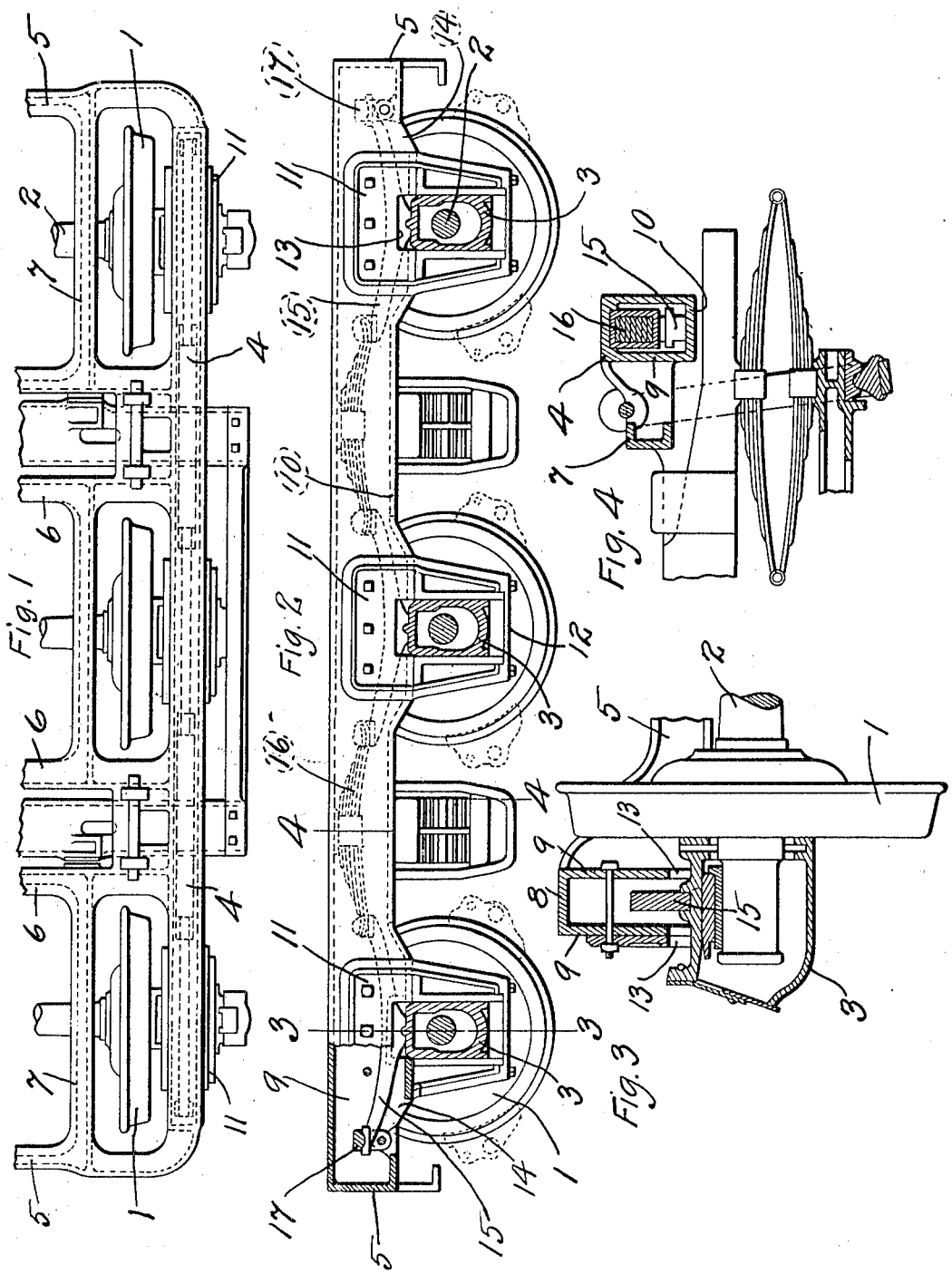

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

TRUCK CONSTRUCTION.

1,080,558. Specification of Letters Patent. Patented Dec. 9, 1913.

Application filed November 25, 1912. Serial No. 733,415.

*To all whom it may concern:*

Be it known that we, CLARENCE H. HOWARD and HARRY M. PFLAGER, citizens of the United States, residing at the city of St. Louis, State of Missouri, have invented a certain new and useful Improvement in Truck Construction, of which the following is a full, clear, and exact description, such as will enable others skilled in the art to which it appertains to make and use the same, reference being had to the accompanying drawings, forming part of this specification, in which—

Figure 1 is a top plan view of the side portion of a truck of our improved construction. Fig. 2 is a side elevational view of the truck with parts thereof in vertical section. Fig. 3 is an enlarged detail section taken approximately on the line 3—3 of Fig. 2. Fig. 4 is an enlarged detail section taken approximately on the line 4—4 of Fig. 2.

Our invention relates generally to truck construction and more specifically to a new and improved construction and arrangement of the truck frame side rails or wheel pieces and the truck equalizing members and this application should be read in connection with an application on truck construction filed by us November 18th, 1912, Serial Number 732,099.

The principal object of our invention is to produce a truck wherein the equalizing members are disposed and combined with parts of the truck frame so that they will in no wise interfere with the free inspection and repair of the brakes, brake heads, and other parts of the truck equipment within the truck frame.

Further objects of our invention are to construct a truck frame having wheel pieces which are substantially box shape throughout their entire length thereby providing an exceptionally strong and rigid construction, to arrange the rigid and flexible equalizing members within the hollow wheel pieces whereby they are protected from injury and providing a very compact structure to materially increase the strength of the truck and decrease the weight thereof and to provide a construction wherein the weight of the frame, and parts carried thereby, is evenly distributed upon the various journal boxes.

To the above purposes our invention consists in certain novel features of construction and arrangement of parts hereinafter more fully described and claimed.

As illustrated in the accompanying drawings our invention is shown as applied to a six-wheel truck, but it will be readily understood that our invention is not limited to use on six-wheel trucks, but may be employed on trucks having other wheel arrangements.

Referring by numerals to the accompanying drawings, 1 designates the wheels mounted upon the usual axles 2, the ends of which latter are journaled in suitable boxes 3.

Our improved truck frame, as shown, is formed in a single piece, preferably by casting, and comprises hollow wheel pieces 4, flanged end rails 5, flanged cross transoms 6, and flanged wheel guards 7, which latter may be dispensed with if desired. The hollow wheel piece which is substantially box shape throughout its entire length comprises a top plate or wall 8, vertically disposed parallel side walls 9, and a bottom wall or plate 10. The portions of the side walls 9 directly above the journal boxes 3 are extended downward a short distance, thereby slightly increasing the depth of the wheel piece adjacent to the journal boxes and at the points where the pedestals 11 are fixed. The jaws of the pedestals extend below the wheel pieces and embrace the journal boxes 3 and the lower ends of the jaws of the pedestals are united by tie straps 12. The bottom wall 10 of the wheel piece is notched or cut away, as designated by 13, immediately above each journal box thereby permitting the wheel piece to move downward with respect to the journal boxes. Formed in the hollow wheel pieces and preferably in the under side thereof at points near the ends are openings 14 which readily permit the insertion or removal of the equalizing members. Arranged within the hollow wheel piece and resting upon each journal box is a rigid equalizing member 15 and bearing on the ends of each adjacent pair of rigid equalizing members are flexible equalizing members 16, preferably in the form of half-elliptic springs, the same bearing against the top wall or plate of the wheel piece. The ends of the rigid equalizing bars 15 at the extremities of the wheel piece are preferably engaged by links 17, the same being pivotally connected to the wheel piece. If desired, the arrangement of the rigid and flexible equalizing members, as just described, may be reversed; that is, with the flexible members positioned on the journal boxes and with the rigid equalizing members bearing against the top of the wheel pieces.

By virtue of the construction just described, the truck frame is yieldingly supported upon the journal boxes and the equalizing members are located wholly within the hollow wheel pieces where they are protected from injury, prevented from dropping on to the track in case they become broken and said parts are disposed so that the brake heads, shown in dotted lines in Fig. 2, and other parts within the truck are in plain sight where they may be readily inspected or repaired.

Our improved arrangement secures a flexible and universal equalization of the weight of the truck frame and parts carried thereby upon the journal boxes and by utilizing half elliptic springs a high degree of flexibility is obtained, thereby making the riding movement of the car more easy and gentle.

We have shown and described a truck frame including its wheel pieces as being cast in a single piece, but it will be readily understood that a built-up structure having hollow wheel pieces may be provided and in either event the rigid and flexible equalizing members are arranged within the hollow or box-like wheel pieces, thus in no wise interfering with the free inspection and repairs of the brakes and other parts within the truck frame and at the same time without materially increasing the height of the top of the truck frame from the tops of the truck rails.

It will be readily understood that minor changes in the size, form and construction of the various parts of our improved truck frame may be made and substituted for those herein shown and described without departing from the spirit of our invention, the scope of which is set forth in the appended claims.

We claim:

1. In a truck construction, a truck frame having a wheel piece which is hollow throughout its entire length and adapted to contain truck equalizing members, the bottom wall of which wheel piece is cut away at certain points to accommodate the journal boxes of the truck and to permit the insertion and removal of said equalizing members.

2. In truck construction, a truck frame having a wheel piece which is substantially box shape in cross section throughout its entire length in order to receive truck equalizing members, the bottom wall of which wheel piece is cut away at certain points to receive the truck journal boxes.

3. In truck construction, a truck frame having a wheel piece which is substantially box shape in cross section throughout its entire length in order to receive equalizing members of the truck, and the bottom walls of which wheel piece is provided with openings to permit the insertion and removal of said equalizing members.

4. In truck construction, the combination with wheel carrying axles and journal boxes, of a truck frame having wheel pieces which are substantially box shape throughout their entire length, which wheel pieces lie wholly above the axles and journal boxes, and equalizing members contained within the box-shaped wheel pieces, certain of which members are supported by the journal boxes.

5. In truck construction, a truck frame lying wholly above the axles and journal boxes of the truck and having wheel pieces which are substantially box shape throughout their entire length, and a series of equalizing members arranged within each box-shaped wheel piece.

6. In truck construction, a truck frame lying wholly above the axles and journal boxes of the truck and having wheel pieces which are substantially box shape throughout their length, and a series of alternately arranged rigid and flexible equalizing members positioned within said box shaped wheel pieces.

7. In truck construction, the combination with wheel carrying axles and journal boxes, of a truck frame having wheel pieces which are substantially box shape in cross section throughout their length, rigid equalizing bars within the box-shaped wheel pieces and resting upon the journal boxes, and flexible equalizing members within the box shape wheel pieces and bearing upon the rigid equalizing members and the truck frame.

8. In truck construction, the combination with wheel carrying axles and journal boxes, of a truck frame yieldingly supported upon the journal boxes which truck frame is provided with wheel pieces which are substantially box-shape throughout their length, said truck frame and wheel pieces lying wholly above the axles and journal boxes of the truck, and which wheel pieces are notched on their under sides for the accommodation of said journal boxes.

9. In truck construction, a truck frame having wheel pieces which are substantially box-shape in cross section, a series of wheel carrying axles, journal boxes therefor, said truck frame and wheel pieces lying wholly above the axles and journal boxes, and a series of equalizing members arranged within the box-shaped wheel pieces, certain of which equalizing members rest upon the journal boxes.

10. In a car truck, a truck frame cast in a single piece and having hollow wheel pieces each comprising a top wall, a bottom wall, portions of which are cut away at predetermined points for the accommodation of the truck journal boxes, and a pair of side walls.

11. In a car truck, a truck frame having a wheel piece which is substantially tubular throughout its length and the wall of which tubular wheel piece is cut away at certain points on the underside to provide openings for the journal boxes, and to permit the insertion and removal of truck parts which are normally located inside said tubular wheel piece.

12. In truck construction, the combination with a series of wheel carrying axles and journal boxes, of a truck frame having wheel pieces each comprising top and bottom plates, and a pair of side walls, and a series of equalizing members located within the box shape wheel pieces for yieldingly supporting the truck frame upon the journal boxes.

13. In truck construction, the combination with a series of wheel carrying axles and journal boxes, of a truck frame having wheel pieces each comprising a top and bottom plate, and a pair of side walls, and a series of equalizing members interposed between the journal boxes and the truck frame for yieldingly supporting the same, which equalizing members are located within the box-shaped wheel pieces.

14. In truck construction, a truck frame having wheel pieces each comprising a top plate, a perforated bottom plate, and a pair of side walls thereby forming a tubular housing adapted to contain essential parts of the truck structure.

15. In truck construction, the combination with a series of wheel carrying axles and journal boxes, of a truck frame having tubular wheel pieces, each comprising a top plate, a perforated bottom plate, and a pair of side walls, and a series of equalizing members located within said tubular wheel pieces for yieldingly supporting the truck frame upon the journal boxes.

In testimony whereof we hereunto affix our signatures in the presence of two witnesses, this 19th day of November, 1912.

CLARENCE H. HOWARD.
HARRY M. PFLAGER.

Witnesses:
CHAS. S. SHALLENBERGER,
HAL C. BELLVILLE.